United States Patent [19]

Locke

[11] Patent Number: 5,068,852
[45] Date of Patent: Nov. 26, 1991

[54] HARDWARE ENHANCEMENTS FOR IMPROVED PERFORMANCE OF MEMORY EMULATION METHOD

[75] Inventor: Thomas P. Locke, Woodinville, Wash.

[73] Assignee: John Fluke Mfg. Co., Inc., Everett, Wash.

[21] Appl. No.: 441,094

[22] Filed: Nov. 24, 1989

Related U.S. Application Data

[63] Continuation-in-part of Ser. No. 275,184, Nov. 23, 1989.

[51] Int. Cl.⁵ .............................................. G06F 11/00
[52] U.S. Cl. .................................................. 371/16.2
[58] Field of Search ...................... 371/16.2, 5.1, 16.1, 371/19

[56] References Cited

U.S. PATENT DOCUMENTS

| | | | |
|---|---|---|---|
| 3,771,131 | 11/1973 | Ling | 371/16.5 |
| 4,055,801 | 8/1970 | Pike | |
| 4,108,358 | 3/1977 | Niemaszyk | |
| 4,189,818 | 9/1977 | Schneider | |
| 4,192,451 | 5/1978 | Swerling | |
| 4,402,055 | 1/1981 | Lloyd | |
| 4,455,654 | 6/1984 | Bhaskar et al. | 371/16.2 |
| 4,550,406 | 6/1985 | Neal | |
| 4,567,592 | 9/1985 | Minicilli | |
| 4,607,366 | 11/1985 | Stadlmeier et al. | |
| 4,618,954 | 10/1985 | Otobe et al. | 371/16.5 |
| 4,622,647 | 7/1986 | Sagnard et al. | |
| 4,639,917 | 1/1986 | Furuta | 371/16.1 |
| 4,641,207 | 3/1986 | Green et al. | |
| 4,641,348 | 11/1986 | Neuder | |
| 4,656,632 | 11/1986 | Jackson | |
| 4,683,568 | 7/1987 | Urban | 371/16.1 |
| 4,687,988 | 6/1987 | Eichelberger | |
| 4,691,316 | 2/1987 | Phillips | |
| 4,845,717 | 7/1989 | Iijima | |
| 4,851,985 | 7/1989 | Burror et al. | 371/16.5 |
| 4,920,479 | 4/1990 | Hashiguchi | 371/9.1 |

*Primary Examiner*—Charles E. Atkinson
*Assistant Examiner*—Phung My Chung
*Attorney, Agent, or Firm*—Marshall M. Curtis; Stephen A. Baker; George T. Noe

[57] ABSTRACT

Addition of gated buffers which are accessible by the test apparatus microprocessor for receiving status information and the signals on some of the lines of the data bus of a microprocessor-based system under test provides the capacity for self testing, automatic calibration, improved diagnostics of a kernel at low levels of kernel operability and faster operation of the test system.

12 Claims, 4 Drawing Sheets

HARDWARE ENHANCEMENTS FOR IMPROVED PERFORMANCE OF MEMORY EMULATION METHOD

CROSS-REFERENCE TO RELATED APPLICATIONS

This is a continuation-in-part of United States application Ser. No. 275,184, entitled HARDWARE ENHANCEMENTS FOR IMPROVED PERFORMANCE OF MEMORY EMULATION METHOD, by Tom Locke, filed Nov. 23, 1989, and commonly assigned to the assignee of this invention.

This application is related to Ser. No. 275,495, KERNEL TESTING INTERFACE AND METHOD FOR AUTOMATING DIAGNOSTICS OF MICROPROCESSOR-BASED SYSTEMS by J. Polstra, M Scott and B. White, Ser. No. 275,183, AUTOMATIC VERIFICATION OF KERNEL CIRCUITRY BASED ON ANALYSIS OF MEMORY ACCESSES by J. Polstra, and Ser. No. 275,185, APPARATUS, METHOD AND DATA STRUCTURE FOR VALIDATION OF KERNEL DATA BUS, B. White, J. Polstra and C. Johnson, assigned to the assignee of the present invention. Technical Field The present invention relates generally to the testing and troubleshooting of microprocessor-based electronic systems and more particularly to testing and troubleshooting of the kernel of microprocessor-based electronic systems using memory emulation technique.
Background of the Invention With the wide use of complex microprocessor-based systems in both consumer and industrial products, automation of testing and diagnosis of circuit faults, particularly of the kernel of such systems, has become extremely desireable. The kernel of such a system is well-understood in the art to refer to the microprocessor, itself, and the associated elements with which it is necessary for the microprocessor to correctly interact to function correctly, specifically the memory, clock, address bus and data bus. So-called emulative testers in which an element of the kernel is emulated by the testing apparatus have become popular for functional testing because they enable detailed diagnostics of the kernel even where the kernel is not even minimally operative.

One type of emulative tester is a microprocessor emulator, exemplified by the tester described in U.S. Pat. No. 4,455,654, issued to K. S. Bhaskar et al and assigned to the John Fluke Mfg. Co., Inc.; In that system, connection is made to the UUT by removing the UUT microprocessor and connecting the test system through the microprocessor socket of the UUT.

Another type of emulative tester is a ROM (or memory) emulator. ROM emulation is deemed desireable since the ROM is in direct communication with the UUT data and address buses and the pin configurations of ROM sockets are relatively simple. ROM emulators are well known for use in software design and operational verification of the microprocessor but have only recently been used for fault detection and diagnosis because no synchronization signal is typically available to synchronize the test equipment with the test results it receives. A solution to this problem is disclosed in U.S. patent application 07/158,223, of M. H. Scott et al, filed Feb. 19, 1988, for MEMORY EMULATION METHOD AND SYSTEM FOR TESTING AND TROUBLESHOOTING MICROPROCESSOR-BASED ELECTRONIC SYSTEMS, and is hereby fully incorporated by reference herein. That test system comprises a microprocessor-based mainframe and an interface pod which also includes a microprocessor-based system which is connected to both the microprocessor and the memory socket of the UUT. The interface pod includes special logic circuitry connected to the UUT microprocessor to provide a fine resolution sync signal pulse during a bus cycle of interest in order to provide full troubleshooting fault isolation that is as effective as that provided by prior art microprocessor emulation since the high resolution sync pulse derived from the microprocessor can be used to isolate and evaluate signals monitored from the address and data buses at the memory socket with the same facility as they could be from the microprocessor connections. Also, as disclosed in that application, ROM emulation may be generalized to memory emulation (e.g. the emulation of any memory or portion of memory) since the trend in microprocessor-based systems is to increase RAM while reducing ROM and possibly eliminating ROM altogether by substituting RAM. Therefore test systems must be adequately generalized to test systems not yet produced but, nonetheless, foreseeable in light of current trends in electronic microprocessor-based system architecture.

It has also long been recognized in the art that providing self-test capability is needed in any piece of testing or diagnostic equipment and, indeed, in most complex or data processing electronic apparatus. This need is especially felt in diagnostic equipment for microprocessor-based systems since the equipment being tested is subject to damage during testing by the application of improper signals to the UUT and also because faulty test equipment may report a functional UUT as faulty, resulting in considerable expense due to needless downtime and lost time in trying to effect an unnecessary repair. As test equipment has become more complex, however, it has often been impractical or impossible to provide full self-test capability without making the complexity and cost of the test apparatus wholly disproportionate to the value of the devices to be tested.

Another long-recognized need in testing and diagnostic equipment is the capacity for self-calibration for properly evaluating the test results captured by the test equipment. As more types and newer generations of microprocessors with complex electrical specifications and internal processing techniques reach the market in various systems, the time spent by the operator in identifying the and recalibration of the test equipment to accommodate the particular microprocessor in the UUT has become increasingly more significant in the overall cost of conducting a test. Similarly, the necessary level of skill of the operator to perform such a function has correspondingly increased and potentially limits the market for such test equipment.

It has also been realized that a comparative weakness of memory emulation as compared to microprocessor emulation is that it is desireable, when testing non-functional or marginally functional kernels, to be able to determine whether data read from memory actually reached the microprocessor over the data bus. For instance, after reset of the microprocessor, data will be read from the first location in the boot memory space and placed on the data bus. Previously, with memory emulation, receipt of that data by the microprocessor relied on the ability of the microprocessor to place that data on the address bus, which operation could be prevented by numerous conditions, such as an improper signal on the microprocessor HOLD or INTR lines, inoperative microprocessor, faults on the data bus, and the like. Since it is desireable to automate as much of the test procedure as possible, it is also desireable to automate the test procedure under the condition of non-functional or marginally functional kernels as well.

Further, both as a matter of the cost of conducting tests with a particular piece of equipment and as a matter of convenience and user confidence, speed of operation is an important attribute of any test instrument and increased data acquisition speed is desireable.

As disclosed in the above noted copending application, KERNEL TESTING INTERFACE AND METHOD FOR AUTOMATING DIAGNOSTICS OF MICROPROCESSOR-BASED SYSTEMS, by Polstra et al, which is hereby fully incorporated by reference, a highly automated testing and diagnostics system has been provided in which the self-test capability, faster performance and the ability to test kernels at an even lower level of operability provided by this invention are of particular value.

OBJECTS OF THE INVENTION

It is, therefore, an object of this invention to provide an enhancement for testing and diagnostic equipment which provides self-test capability for all major functional elements of the testing system.

It is another object of this invention to provide an enhancement for testing and diagnostic equipment which provides automatic calibration to accommodate a wide variety of microprocessors in microprocessor-based systems to be tested.

It is another object of this invention to provide an enhancement for testing and diagnostic equipment which provides improved diagnostics of non-functional and marginally functional system kernels.

It is yet another object of this invention to provide an enhancement for testing and diagnostic equipment which provides improved speed of data capture and test performance.

It is a particular object of the invention to provide the above-enumerated enhancements in the method and apparatus disclosed in the above noted copending application entitled KERNEL TESTING INTERFACE AND METHOD FOR AUTOMATING DIAGNOSTICS OF MICROPROCESSOR-BASED SYSTEMS by J. Polstra, M. Scott and B. White (Polstra et al).

DISCLOSURE OF THE INVENTION

The invention is directed to an apparatus for testing microprocessor-based systems having a kernel including a microprocessor by memory emulation, including a gated data buffer coupled to at least one data bus line at the input of said microprocessor, a gated status buffer means coupled to at least one external connection of said microprocessor which carries a signal indicative of the operational status of said microprocessor and a synchronization signal generator responsive to the signal on the external connection of said microprocessor for generating a synchronization signal for controlling the acceptance of signals by both of the gated buffers. This combination of structure provides improved kernel diagnosis capability at low operational levels of the microprocessor and inoperative kernels, self test-capability, self calibration and improved speed of signal capture.

The invention also comprehends an apparatus for calibrating testing apparatus for microprocessor-based systems having a kernel including a microprocessor and a data bus by memory emulation, comprising apparatus for storing a predetermined bit pattern in an emulation memory, a reset overdriving circuit for causing the microprocessor to command placement of the predetermined bit pattern on the data bus and means for counting bus cycles of the microprocessor subsequent to a READ operation and prior to the appearance of the predetermined bit pattern on said data bus. A synchronization circuit generates a synchronization signal a number of bus cycles after each microprocessor command equal to the number of bus cycles counted.

The invention also comprehends a method for calibrating testing apparatus for microprocessor-based systems having a kernel including a microprocessor and a data bus by memory emulation, comprising the steps of storing a predetermined bit pattern in an emulation memory, causing the microprocessor to command placement of the predetermined bit pattern on the data bus, counting bus cycles of the microprocessor subsequent to a READ operation and prior to the appearance of the predetermined bit pattern on the data bus and generating a synchronization signal a number of bus cycles after each microprocessor command equal to the number of bus cycles counted.

The invention further includes a self-test circuit means comprising a gated data buffer circuit means and a gated status buffer circuit means, and a self-test connector means for connecting the sync module and the memory module to an input/output port of said apparatus to permit the testing apparatus to self-test all of its elements including the sync module.

These and other objects of the invention will become evident to those skilled in the art from the following detailed description of the invention with reference to the accompanying drawings.

BEST MODE OF PRACTICING THE INVENTION

Overview

Figure 1:
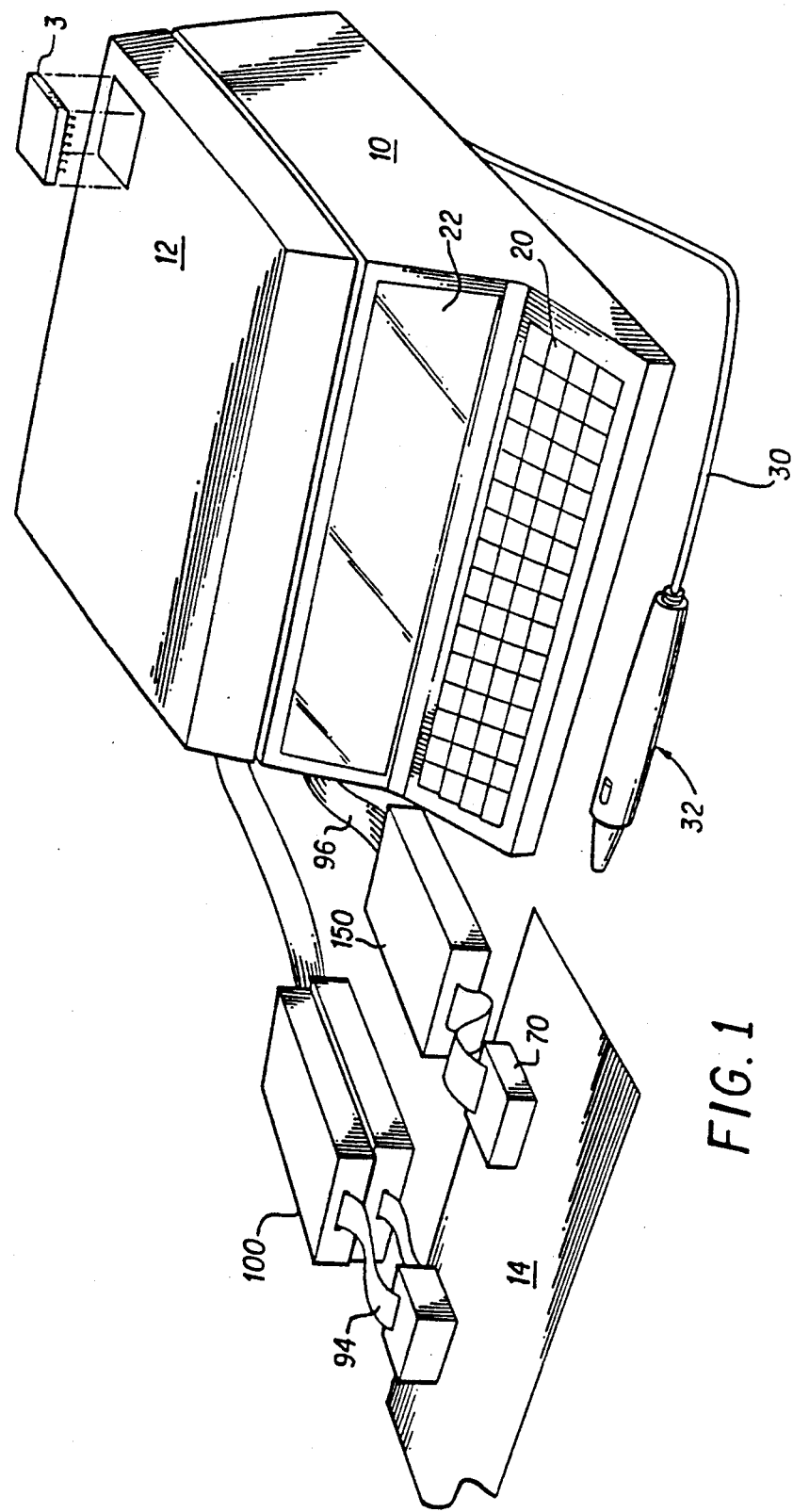
FIG. 1 is an illustration of the testing apparatus incorporating this invention.
Figure 2:
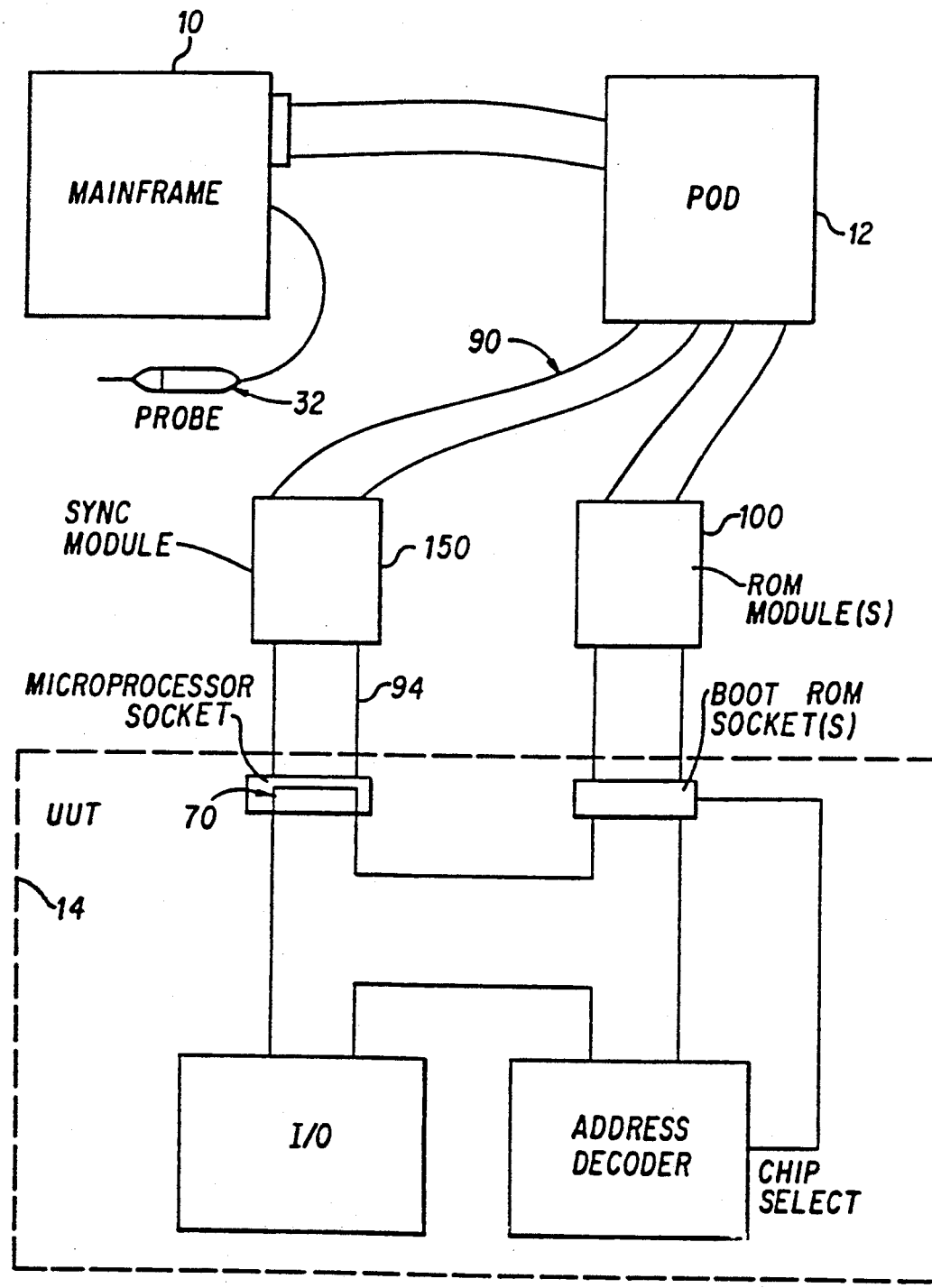
FIG. 2 is a simplified block diagram of the invention.

As an overview of the invention, with reference to FIG. 1, test apparatus connected to a UUT 14 includes a mainframe processor 10, arranged in a compact housing and including a keyboard 20, probe 32 and display 22, an interface pod 12, a sync module 150, a sync module adapter 160, and at least one memory module 100 (two being illustrated) depending upon the memory configuration of the UUT 14. The memory module(s) connect to the UUT by a multi-conductor cable 92 and a plug corresponding to the UUT memory Socket 72. FIG. 2 schematically illustrates the interconnection of the system shown in FIG. 1, showing the preferred arrangement of the apparatus in a plurality of housings. It is to be understood that the particular articulation of the elements of the system while being preferably as shown for the convenience of the operator could be packaged in more or fewer elements than shown. For instance, the pod could be entirely included within the same housing as the mainframe. It is also to be noted in FIG. 2 that while the memory module is electrically substituted for the UUT memory, either by physical replacement or by parallel connection while disabling the UUT memory, the sync module is connected to the UUT microprocessor which is left in place in the UUT circuit. It is also to be noted that while the sync module 150 is connected to the UUT 14 through a ribbon cable 140 and sync module adapter 150, this arrangement is for the convenience of the user. Any connection of the sync module to the desired nodes will work, including flying leads with clips, dedicated test connectors on the UUT, or clip-over units, all of which are well understood in the art for the purpose of making the necessary connections to the UUT.

Figure 3:
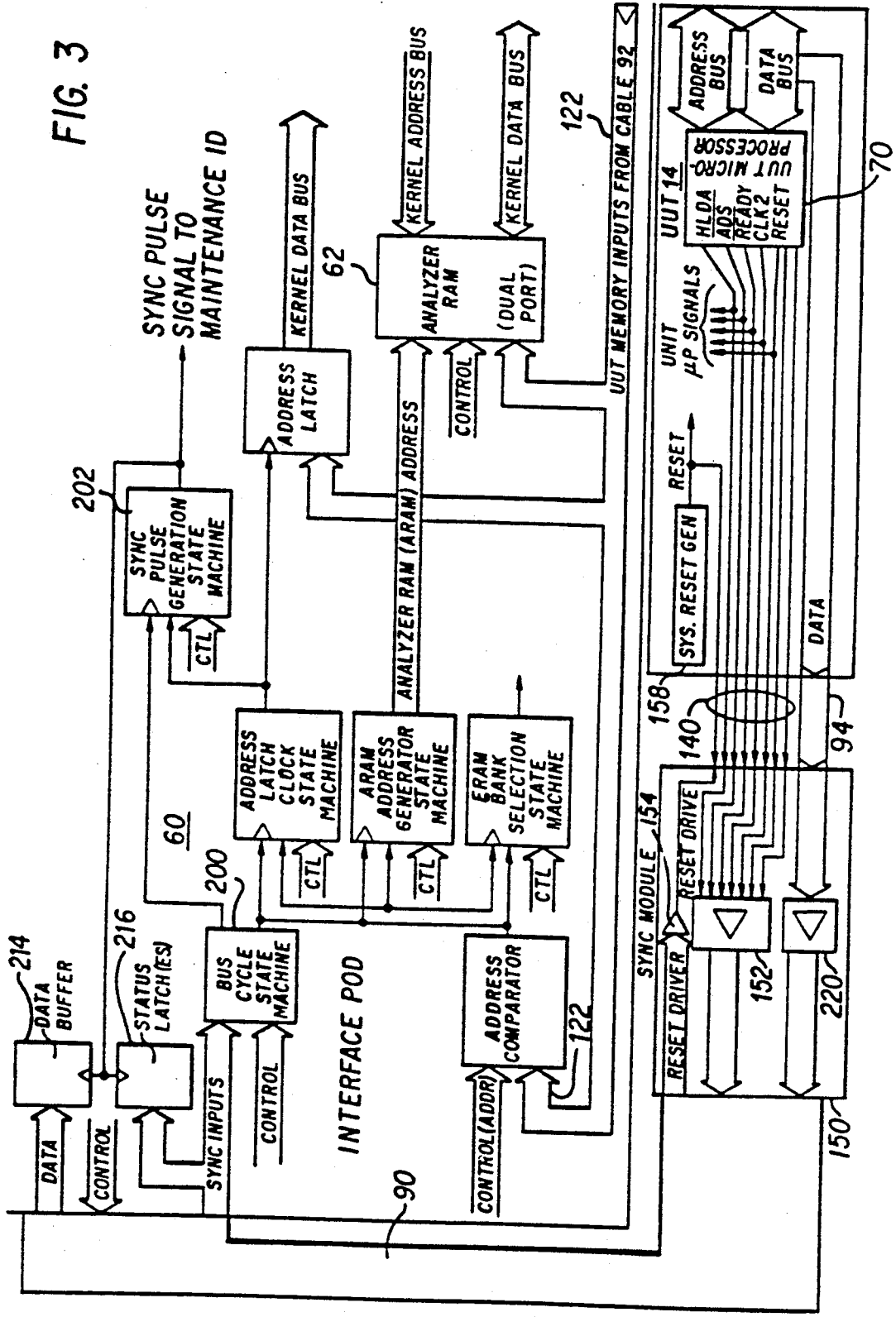
FIG. 3 is a detailed block diagram of the overall system as shown in FIG. 2.

The inclusion of two features of the invention is shown in FIG. 3. Specifically the inclusion (as compared to the apparatus disclosed in the above incorporated KERNEL TESTING INTERFACE AND METHOD FOR AUTOMATING DIAGNOSTICS OF MICROPROCESSOR-BASED SYSTEMS) of additional buffers 220 within the sync module 150, and of additional gated buffers 214 and 216 within the interface pod 12. The additional buffers 220 within the sync module 150 may be otherwise unused buffers already present in the sync module. In any case, the additional buffers, in accordance with the invention, are connected to the data bus 74 of the UUT processor 70. All connections from the sync module 150 to the UUT 14 are made via a cable or interconnect assembly 140. The preferable method of connection is by means of a sync module adapter 160 which brings these newly required microprocessor data bus lines, and the other microprocessor lines already required for the sync module, to a single connector. With this adapter 160 installed, the interconnect cable 140 can be a simple ribbon cable. All buffered outputs from the sync module 150 are routed to the interface pod 12 via a ribbon cable 90. According to the invention, gated buffers are provided for data inputs to the pod at 214 and for status inputs to the pod at 216.

Figure 4:
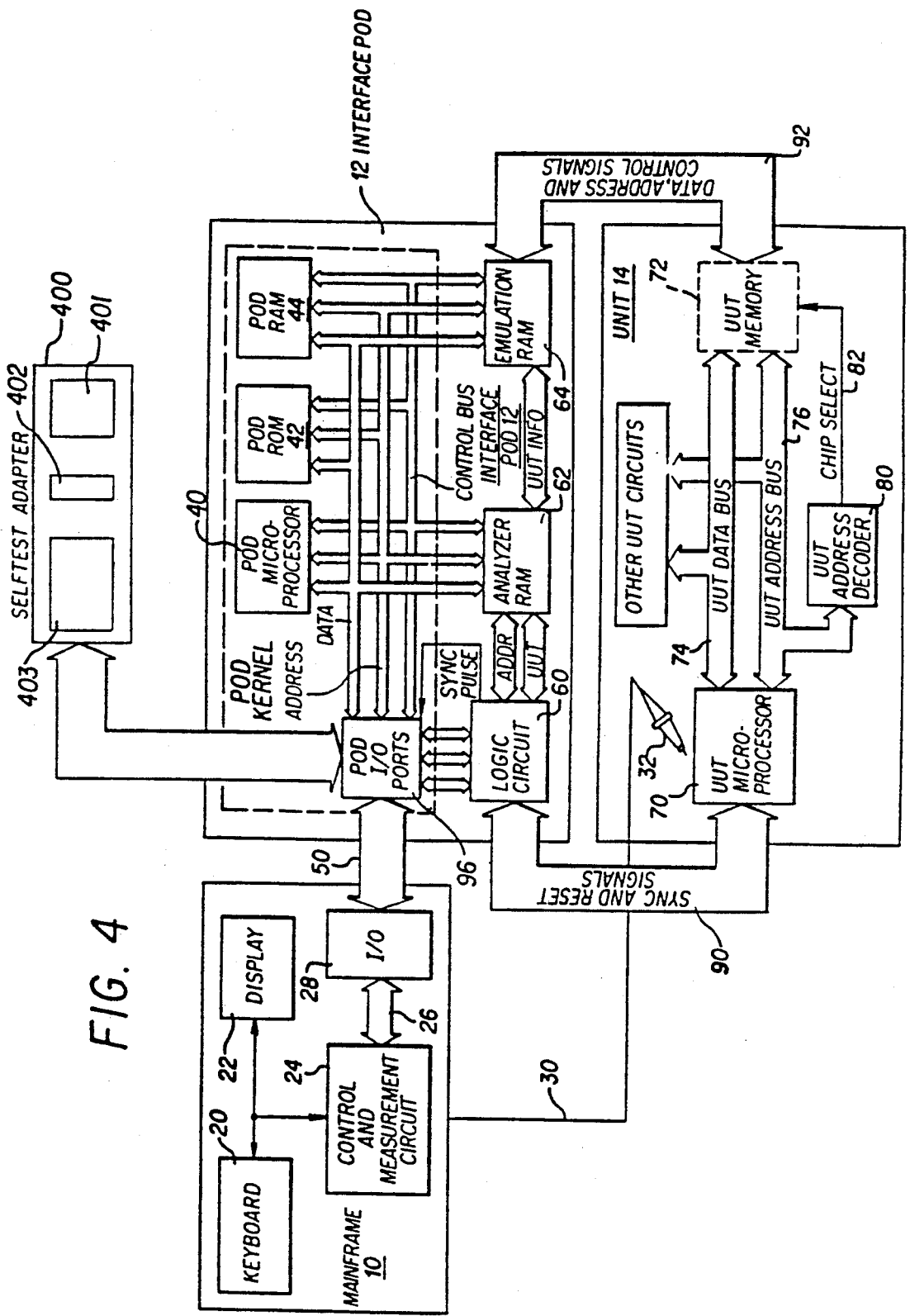
FIG. 4 is a detailed block diagram of the implementation of this invention in the system of FIG. 3.

Turning briefly to FIG. 4, an additional feature of the invention in which the connection of the self-test adapter 400, including protection circuits 403, sync module connector 402 and memory module socket 401 is illustrated. For performing a self-test of the testing system, the memory and sync modules will be connected to the self-test adapter rather than a UUT. This connection provides direct access from the memory and sync modules to an input/output port of the testing system, as will be explained below.

OVERVIEW OF SYSTEM AND THE EFFECTS OF THE INVENTION ON THE SYSTEM

With the above brief overview of the invention in mind, operation of the system will be reviewed as background for understanding the operation of the enhancements constituting the invention. The above overview is brief and reference is made to the full descriptions provided in the applications incorporated by reference herein and referred to in the Cross-References to Related Applications, above.

In normal use, an emulative based tester uses READ and WRITE instructions to test a UUT. The test system provides some enhanced tests using these READ and WRITE functions such as RAM TEST and ROM TEST. These tests include diagnostics if the test fails.

The user can test and diagnose other portions of the UUT directly using the READ and WRITE instruction, or write a program which will do the READ and WRITES automatically.

The system additionally provides a SYNC pulse with some other primitives. This SYNC pulse can be used for test purposes, or it can be used for troubleshooting a defective UUT. The SYNC is a timing signal to an input device such as the probe 32 or an optional I/O MODULE. This timing signal is used to sample or latch the input at the correct time. The sampled input can be used singly to determine if the input was in the correct state, or the input can be sampled multiple times in the form of a cyclic redundancy check signature (CRC) to determine if the reaction to multiple stimuli is correct.

The generation of the SYNC pulse requires some UUT-specific knowledge or calibration. This invention allows for an automated calibration or collection of this knowledge, with less chance for error and less requirement for user interaction.

Using a Memory Device Emulator (MDE) to do READ and WRITE operations requires that a basic portion of the UUT is functional. This basic portion of the UUT is often referred to as the kernel or as the boot space. The testing system provides a procedure called a bus test to verify the functionality of the boot space. If the bus test passes, the user can go on to normal testing and troubleshooting of the UUT. If the bus test fails, the system uses a plurality of novel procedures to generate diagnostics to aid the user in repairing the kernel. These procedures are used in a self bootstrapping sequence as disclosed in KERNEL TESTING METHOD FOR AUTOMATING DIAGNOSTICS OF MICROPROCESSOR-BASED SYSTEMS, incorporated by reference above. The present invention allows for a more automated implementation of these automatic diagnostics, with less user interaction and probing.

When using a MDE to do a READ function, the microprocessor on the UUT performs the actual read operation. A method is needed for the MDE to determine what was the actual data the microprocessor read. The customary method is for the microprocessor to read one or more addresses in a special reserved area of the boot ROM space. The actual address read is then latched, with some bits of the latched address corresponding to some bits of the READ data. This process is repeated until all the READ data is returned. This customary method is cumbersome, slow, and takes up a lot of valuable area in the boot ROM space. The present invention allows a procedure which is quicker, more direct, and has no space penalty.

Since the testing system is used to test defective UUTs, it can easily be exposed to over voltage and over current conditions. Even though the portions of the system which connect directly to the UUT will preferably have designed-in protection, no protection is perfect, and these portions of the tester are subject to damage from excessive conditions in the UUT. A good selftest of the UUT connections is therefore very desirable. Portions of the invention allow for much easier self test and diagnostics of the SYNC Module which connects to the UUT.

DETAILED DESCRIPTION OF THE INVENTION.

The invention includes a means of capturing UUT information at controlled times, and making this information available to the MDE in a simple manner. The invention also includes the knowledge of how to use, (or the ability to use), this information to enhance operations of the MDE. The preferred implementation is shown in FIG. 3. Gated buffers or latches 214 are added to the Interface Pod 12. The outputs of these buffers is available to the pod microprocessor (40 on FIG. 4) upon request. The inputs to these buffers is data from the UUT's Data Bus 74. In this implementation, the data is buffered by line drivers 220 in Sync Module 150. The buffers allow for driving the cable 90, and for reduced loading effects on the UUT. The connection to the UUT is through cable assembly 140. This may include a Sync Module Adapter 160 connected into the UUT microprocessor socket for user convenience. The method of connection depends upon the UUT, and could include the Sync Module Adapter, dedicated test connectors, clip module, or individual spring clips. Similar gated buffers or latches 216 are also added to Interface Pod 12, with the difference that the inputs to these gates are from some UUT timing signals, sometimes referred to as Status Lines or Control Lines. These lines can include, but are not limited to, the lines going to the Bus Cycle State Machine 200. The lines to the buffers and the Bus Cycle State Machine can include both UUT microprocessor inputs and outputs. These lines are also shown buffered by line Drivers 152 in Sync Module 150.

As shown in FIG. 3, some of the UUT microprocessor timing signals go to the Bus Cycle State Machine 200 which uses them to monitor the operational state of the UUT. For example, when used with an 80386 microprocessor based UUT, the Bus Cycle State Machine monitors CLK2 (the two times clock into the microprocessor), RESET, READY#, ADS# (Address Strobe), HOLD, and HLDA (Hold Acknowledge). The Bus Cycle State Machine performs logical operations upon these inputs to provide clocking signals for the rest of the interface pod. The output signals correspond to the timing of various cycles within the UUT microprocessor, for instance, the address bus cycle or the data bus cycle. The output clocks from the Bus Cycle State Machine, along with various other controls, is used by the Sync Pulse Generation State Machine 202 to form a sync pulse. This Sync Pulse identifies a very specific cycle of interest.

Examples of these cycles of interest are the first data cycle after RESET or third address cycle after the recognition of an opcode fetch from a predetermined address. The Sync Pulse allows a sampling window to be placed on a single activity of interest. It should also be noted that the Sync Pulse Generation State Machine also allows generation of Sync Pulses under Interface Pod microprocessor control for testing purposes.

The Sync Pulse from the Sync Pulse State Machine is used to strobe or clock the aforementioned gated buffers which are used in the preferred implementation of this invention. This clocking allows latching the information at optimal time for analysis and diagnosis. It is to be noted that the preferred implementation should include provisions for matching timing delays and the skews from the various UUT signals to the gated buffers with the delays and skews which occur in actually generating the clock to the gated buffers. It is also to be noted that the actual amount of delay is not as important as the matching of the delay or skew. This assumes that the induced delay does not alter the actual signals.

It should be noted that it is not necessary to diagnose all data bus lines in this manner or provide a gated buffer for all data lines since the invention improves the diagnostic function of the test apparatus to test and diagnose any number of lines rather than only verifying their functionality. In the preferred embodiment, as a compromise between performance and increased hardware, the gated buffer 214 monitors only eight data lines since, as disclosed in Polstra et al, supra, if these can at least be verified, the remainder will be diagnosed by the address and data stimulus primitives. In this case, full automated diagnostics of those eight data lines can be accomplished instead of only verification of their functionality. Also, this feature operates optimally with eight bit microprocessors since microprocessors with sixteen or more data lines require multiple WRITES to return data.

However, the preferred embodiment is a compromise between increased hardware and its associated increases in cost, size, and power requirements, and the increase performance and utility the additional circuitry provides. For ideal full functionality all UUT microprocessor timing signals should be sampled. In practice, some of the signals are impractical to monitor as their functions are totally asynchronous to the microprocessor operation, and therefore difficult or impossible to diagnose. For most systems, 8 lines appear to be sufficient for diagnosing a majority of the problems. The use of additional lines does not provide a proportional benefit in performance. Eight data lines also seem to be sufficient for most microprocessors with 16 or 32 bit data busses. The copending application Ser. No. 275,185 for APPARATUS, METHOD AND DATA STRUCTURE FOR VALIDATION OF KERNEL DATA BUS, by B. White, J. Polstra and C. Johnson fully discloses a method for diagnosing the reset of the data bus of this width when 8 bits can be proven good. Eight bits fully cover all microprocessors with 8 bit data busses.

Within the spirit and scope of this invention, additional hardware could be added to provide more information. This could include, but is not limited to, hardware to record asynchronous history information on the monitored lines, as opposed to the synchronous information provided by the gated latches. The asynchronous information could be used to identify lines which are hard tied to a high or low state on a dead or defective kernel. With a defective kernel, it is not always possible to reliably produce a state where a particular signal is high and another where the signal is low. The asynchronous information could identify which signals are NOT stuck, eliminating them from the suspect list, and reducing the troubleshooting path.

USING THE INVENTION FOR CALIBRATION

The data gated buffers 214 permit the automatic calibration of the pod for the bus cycle after reset in which bit patterns of the stimulus primitives can be expected to appear. This is done simply by doing a UUT write of known data and then determining the bus cycle count after reset when the data in gated buffer 214 matches the write data and adjusting the sync count accordingly to place the sync pulse in the correct bus cycle.

The Test System produces a Sync Pulse as previously described. This Sync pulse is used for gating a Probe or other input module for testing and troubleshooting devices not directly connected to the UUT microprocessor. This Sync Pulse is produced at a time which is a programmable number of cycles after a recognition event. The recognition event is similar to fetching the opcode which produces the desired event, or possibly a RESET. The design of the UUT can affect the number of cycles between the recognition event and the desired event, requiring calibration of this count for each type of UUT. The invention allows easy calibration of this count on a functional UUT. The Interface Pod can repeatedly cause a WRITE of known data while adjusting the count. When the data latch captures the correct data, the count is correctly calibrated for the particular UUT.

It is desirable to repeat this process with different data for verification. This is because a defect such as a tied or latched line can cause an erroneous match of the predetermined pattern and the pattern monitored. The verification of the number of processing cycles with another bit pattern and updating of the cycle count on the basis of such further processing cycle count, if necessary, provides the capability of reliably producing a synchronization signal for test bit pattern sampling in an adaptive manner. The procedure requires no user knowledge or intervention other than that attaching the test system to a known good UUT, and then executing a system function to save the results. Once the values which can be automatically calibrated are obtained, other needed values can be determined by microprocessor-dependent known relationships.

USING THE INVENTION FOR CAPTURING READ DATA

Using the invention for the MDE to obtain the UUT microprocessor READ data is simply the reverse of the calibration procedure. Once it is known how to generate the correct Sync Pulse, a WRITE of the captured data to a convenient user-chosen address will latch the data in the gated buffer where it is immediately available to the MDE system. If the data contains more bits than are monitored, multiple writes are required. This is much simpler and more direct than the previous system, and also only requires one address space which can be selected anywhere within the UUT address space.

Similarly, since lines 94 connect to the data bus connections to the microprocessor, through buffers 220 and cable 90 to the data gated buffer 214, gated buffer 214 will also act as a sample-and-hold circuit for the states of data bus outputs. The contents of the two gated buffers 214 and 216 thus provide a much more efficient path to the pod microprocessor.

After the UUT microprocessor executes a READ, the bits appearing as input to the UUT microprocessor from the data bus will also appear in gated buffer 214 where the pod microprocessor can access them as part of the READ operation. Therefore, the UUT microprocessor need not perform a WRITE to return the bit patterns to the pod. Further, by providing an alternative path for bit patterns to the pod, kernel diagnostics are improved for non-functional and marginally functional kernels since it can immediately be determined if data read from the emulation memory actually reached the microprocessor.

AUTOMATING DIAGNOSTICS ON A DEFECTIVE KERNEL

As stated previously, a memory emulation system is severely crippled by a defective kernel. The problem must be diagnosed and repaired before further testing can continue. The testing system provides a procedure called BUS TEST as disclosed in detail in the copending application KERNEL TESTING INTERFACE AND METHOD FOR AUTOMATING DIAGNOSTICS OF MICROPROCESSOR BASED SYSTEMS, incorporated by reference above, for this purpose. The basis for this procedure is resetting the UUT microprocessor and having it attempt to exercise the code provided by the ROM Modules at the RESET address. This attempt is then monitored, and if successful, the kernel is sufficiently operational to continue testing.

The main monitoring is done by the Analyzer RAM, (62 in FIG. 4), which captures the addresses accessed in the ROM Modules. This allows the system to see if the UUT exercised all, some or none of the code. If NONE or very little of the code is exercised, some of the microprocessor timing lines are the main suspects. The system can use the status buffer to read the condition of these lines. If the UUT kernel is insufficiently functional to produce the correct clocking signals, the testing system forces Sync Pulses to allow reading. This allows diagnostics of the most critical and problem causing lines without user intervention or probing.

The system provides an operation primitive which will RESET the UUT, output any desired data at the reset address, and produce a SYNC pulse for the first operation after RESET. By using this operation with various data, and reading the data latched in the data monitoring buffers by the Sync Pulse, it is possible to fully test and diagnose the data lines between the ROM Modules and the UUT microprocessor for all monitored data lines, again without user probing or intervention. If the data lines prove good, the system has procedures for then testing the rest of the data lines and, if they prove good, for testing the ROM Module address lines. Again, all of these tests are automatically done without user intervention.

IMPROVING SELFTEST BY USING THE INVENTION

As shown in FIG. 4, a pod input/output port is provided for a self-test adapter 400. The self-test adapter contains protection circuits to prevent operator hazards and includes two connectors to receive connectors of the sync module and the memory module. When these connections are made to the self-test adapter instead of a UUT, the pod microprocessor sees the emulation memory as the UUT memory and the emulation memory sees the pod microprocessor as the UUT microprocessor. By this connection, in combination with the storage provided by gated buffers 214 and 216 serving to separate cycles of input and output, all elements of the testing system, including the sync module, can be made to self-test since the pod itself is a microprocessor-based system. When this is done, it is useful to enable the pod microprocessor to be capable of overriding sync pulse generation either at bus cycle state machine 200 or at sync pulse generation state machine 202 to provide greater control of the storage period of the gated buffers. The system has a group of I/O ports shown as 46 in the interface pod 12 in FIG. 4. These connect to a Selftest Adapter 400, which contains protection circuitry 403, ROM Module Socket 401, and Sync Module Connector 402. A ribbon cable can be connected between the Sync Module and the Sync Module Connector on the Self Test Adapter. This is the same ribbon cable 140 which normally connects between the Sync Module 150 and the Sync Module Adapter 160 as shown on FIGS. 1, 2, and 3. With the Sync Module connected to the Selftest Adapter, the I/O ports can be caused to place a variety of patterns on the inputs of the Sync Module which normally monitor the UUT microprocessor timing signals and Data Lines. The results of these patterns are then read at the buffered latches provided by the invention, allowing full test of the Sync Module circuits which are exposed to potentially hostile conditions on a bad UUT. The overdrive circuits within the Sync Module can also be tested by attempting to overdrive the outputs of the I/O port, and reading the results at the buffered gates.

In summary, the inclusion of gated buffers coupled to some of the status pins and some of the data pins provides the test apparatus the capability of faster transfer of data from the data bus to the test apparatus microprocessor, the capability of diagnosing the data bus automatically even when the UUT ᵩP is non-functional and the capability for self-calibration of the test apparatus. With the further provision of a connector for coupling the emulation memory connector and the microprocessor connector to an input/output port of the test apparatus, the addition of gated buffers enable a full self-test of the testing apparatus including the sync module. If deemed necessary or desireable in view of the length of connecting cable utilized, buffers may be used in the lines connected to the data bus connection pins of the microprocessor.

Having thus fully described the invention in detail it will be appreciated that many variations and modifications will be apparent to persons skilled in the art without departing from the spirit and scope of the invention. The detailed description set forth above is intended as being by way of example and not of limitation; the scope of the invention being limited only by the appended claims.

I claim:

1. An apparatus for testing, by memory emulation, a microprocessor-based unit under test (UUT) having a kernel formed by at least a microprocessor, a memory, an address bus and a data bus, said apparatus comprising:
   an emulation memory connectable to said UUT in substitution for said UUT memory during testing of said UUT;
   means for reading data from said emulation memory under control of said UUT microprocessor; and
   a buffer circuit, comprising (a) gated data buffer means coupled to at least one data bus line at a data input of said microprocessor,
   (b) gated status buffer means coupled to at least one external connection of said microprocessor for carrying a signal indicative of an operational status of said microprocessor and
   (c) synchronization signal generation means responsive to said signal on said at least one external connection of said microprocessor for generating a synchronization signal for controlling acceptance of signals by both said gated data buffer means and said gated status buffer means; and
   output means for reading out data stored in said buffer circuit.

2. The apparatus according to claim 1, wherein said gated data buffer means and said gated status buffer means are coupled to said microprocessor by coupling means including respective conductor means in a common cable.

3. The apparatus according to claim 2, wherein said coupling means includes a respective buffer means for each said conductor means.

4. The apparatus according to claim 3, further including a test system evaluation means for evaluating signals captured by said test apparatus and wherein
said output means includes means for coupling at least said gated data buffer means to an input of said test system evaluation means.

5. The apparatus according to claim 4, wherein said test system evaluation means is a microprocessor.

6. An arrangement for calibrating a memory evaluation test apparatus which tests a microprocessor-based unit under test (UUT) having a kernel formed by at least a microprocessor, a memory and a data bus and an address bus, said arrangement comprising:
   emulation memory means connectable to said UUT in substitution for said UUT memory during calibration of said testing apparatus,
   means for loading a selected bit pattern into a predetermined location in said emulation memory means,
   means for causing said microprocessor to access said preselected location of said emulation memory whereby said emulation memory is caused to place said preselected bit pattern on said data bus,
   synchronization signal generation means including means for comparing signal bits appearing on said data bus with bits of said preselected bit pattern and bus cycle counting means for counting bus cycles prior to when said comparison means detects a bit pattern on said data bus matching said bits of said preselected bit pattern, and
   means for producing a synchronization signal a number of bus cycles after further access of said emulation memory equal to the number of bus cycles counted by said counting means.

7. A method for calibrating a memory emulation testing apparatus which tests a microprocessor-based systems having a kernel formed by at least a microprocessor, a memory and data and address busses, said method comprising the steps of:
   storing a predetermined bit pattern in an emulation memory,
   causing said microprocessor to command placement of said predetermined bit pattern on said data bus,
   counting bus cycles of said microprocessor subsequent to said causing step and prior to an appearance of said predetermined bit pattern on said data bus, and
   generating a synchronization signal a number of bus cycles after each microprocessor command equal to the number of bus cycles mounted in said counting step.

8. Apparatus for testing, by memory emulation, a microprocessor-based unit under test (UUT) having a kernel formed by at least a microprocessor and a memory, comprising:
   an emulation memory for connection to said UUT in substitution for said UUT memory during testing of said UUT;
   first connection means for connecting said emulation memory to said system;
   second connection means for connecting said apparatus to at least one status pin and one data input pin of said microprocessor;
   means for reading data from said emulation memory under control of said UUT microprocessor; and
   a self-test circuit means, comprising:
   (a) a gated buffer circuit means including a gated data buffer circuit means and a gated status buffer circuit means, (b) connector means for connecting said first connection means and said second connection means to an input/output port of said apparatus, and (c) means for reading data stored in said gated buffer circuit means to self-test said apparatus.

9. An adaptive synchronization signal generating circuit for use in a tester for microprocessor-based systems including a microprocessor, a memory and a memory access bus, said circuit including:

means for causing a predetermined bit pattern to be read from said memory and placed on said memory access but at a predetermined time, means for monitoring said memory access bus to detect an occurrence of said predetermined bit pattern, means for counting processing cycles of said microprocessor between said predetermined time and detection of said predetermined bit pattern by said means for monitoring said memory access bus, and means for storing a count produced by said means for counting processing cycles of said microprocessor.

10. An adaptive synchronization signal generating circuit for use in a tester for microprocessor-based system as recited in claim 9, further including:

means for causing a second predetermined bit pattern to be read from said memory and placed on said memory access but at a predetermined time, and means for updating storage by said means for storing of said processing cycle count by said means for counting processing cycles of said microprocessor based on a count of processing cycles between said second predetermined bit pattern being read from said memory and detection of said second predetermined bit pattern on said memory access bus.

11. An adaptive synchronization signal generating method for use in a tester for microprocessor-based systems including a microprocessor, a memory and a memory access bus, including the steps of:

causing a predetermined bit pattern to be read from said memory and placed on said memory access bus at a predetermined time, monitoring said memory access bus to detect an occurrence of said predetermined bit pattern, counting processing cycles of said microprocessor between said predetermined time and detection of said predetermined bit pattern, and storing said count of processing cycles of said microprocessor between said predetermined time and detection of said predetermined bit pattern.

12. An adaptive synchronization signal generating method for use in a tester for microprocessor-based systems as recited in claim 11, further including steps of causing a second predetermined bit pattern to be read from said memory and placed on said memory access bus at a predetermined time, and updating storage of said processing cycle count based on a count of processing cycles between said second predetermined bit pattern being read from said memory and detection of said second predetermined bit pattern on said memory access bus.

* * * * *